US008974714B2

(12) United States Patent
Garibbo et al.

(10) Patent No.: US 8,974,714 B2
(45) Date of Patent: Mar. 10, 2015

(54) PROCESS FOR THE PREPARATION OF SUPERHYDROPHOBIC FILM

(75) Inventors: Alessandro Garibbo, Genoa (IT); Corrado Boragno, Genoa (IT); Francesco Gagliardi, Genoa (IT)

(73) Assignee: Universitá Degli Studi Di Genova, Genoa (IT)

( * ) Notice: Subject to any disclaimer, the term of this patent is extended or adjusted under 35 U.S.C. 154(b) by 815 days.

(21) Appl. No.: 13/263,730

(22) PCT Filed: Apr. 8, 2010

(86) PCT No.: PCT/IB2010/000781
§ 371 (c)(1),
(2), (4) Date: Mar. 27, 2012

(87) PCT Pub. No.: WO2010/116246
PCT Pub. Date: Oct. 14, 2010

(65) Prior Publication Data
US 2012/0181717 A1 Jul. 19, 2012

(30) Foreign Application Priority Data

Apr. 9, 2009 (IT) ............................. TO2009A0279

(51) Int. Cl.
*B29C 39/14* (2006.01)
(52) U.S. Cl.
CPC .................................. *B29C 39/148* (2013.01)
USPC ............................ 264/293; 264/299; 264/319

(58) Field of Classification Search
USPC .......................................... 264/293, 299, 319
See application file for complete search history.

(56) References Cited

U.S. PATENT DOCUMENTS

| 8,707,999 B2 * | 4/2014 | Kim et al. ........................ 138/39 |
| 2005/0208268 A1 * | 9/2005 | Extrand .......................... 428/141 |
| 2007/0166464 A1 * | 7/2007 | Acatay et al. .................. 427/346 |
| 2008/0248281 A1 * | 10/2008 | Nakaguma et al. ......... 428/312.8 |

OTHER PUBLICATIONS

PCT International Search Report for PCT Counterpart Application No. PCT/IB2010/000781 containing Communication relating to the Results of the International Search Report, 3 pgs., (Aug. 3, 2010).
PCT Written Opinion of the International Searching Authority for PCT Counterpart Application No. PCT/IB2010/000781, 3 pgs., (Aug. 3, 2010).
Kahp Y. Suh, et al., "Observation of High-Aspect-Ratio Nanostructures using Capillary Lithography", Advanced Materials, vol. 17, No. 5, XP002554128, pp. 560-564, (Mar. 8, 2005).

(Continued)

*Primary Examiner* — James Sanders
(74) *Attorney, Agent, or Firm* — Blakely, Sokoloff, Taylor & Zafman LLP

(57) ABSTRACT

Process for the preparation of a superhydrophobic film comprising the steps of applying a hydrophobic polymer in the liquid phase on a surface so as to form a layer of hydrophobic polymer, applying on said layer of hydrophobic polymer a membrane having a porosity of between $10^5$ and $6 \times 10^8$ pores/$cm^2$ in which the pores have a diameter smaller than or equal to 3 μm, subjecting said layer of hydrophobic polymer to a thermal treatment so as to form a superhydrophobic film, and removing said membrane.

10 Claims, 2 Drawing Sheets

(56) References Cited

OTHER PUBLICATIONS

P. Kim, et al., "Fabrication of Nanostructures of Polyethylene Glycol for Applications to Protein Adsorption and Cell Adhesion", Nanotechnology, vol. 16, XP002554129, pp. 1-7, (2005).

Enoch Kim, et al., "Polymer Microstructures formed by Moulding in Capillaries", Nature, vol. 376, XP002554130, pp. 581-584, (Aug. 17, 1995).

Tae Oh Yoon, et al., "Formation of Superhydrophobic Poly(Dimethysiloxane) by Ultrafast Laser-Induced Surface Modification", Optics Express, vol. 16, No. 17, pp. 12715-12725, (Aug. 18, 2008).

Carolyn Krause, "Extremely Waterproof—Making some of the World's most Water-Repellent Surfaces has become an ORNL Niche", Oak Ridge National Laboratory Review, vol. 41, No. 2, retrieved from the Internet: http://www.ornl.gov/info/ornlreview/v41_2_08/article11.shtml, 2 pgs., (2008).

Anish Tuteja, et al., "Designing Superoleophobic Surfaces", Science, vol. 318, pp. 1618-1622, (Dec. 7, 2007).

PCT International Preliminary Report on Patentability for PCT Application No. PCT/IB2010/000781, 4 pgs. (Oct. 11, 2011).

M. Hikita, et al., "Super-Liquid-Repellent Surfaces Prepared by Colloidal Silica Nanoparticles Covered with Fluoroalkyl Groups," Langmuir, vol. 21, No. 16, pp. 7299-7302 (2005).

M. Sun, et al., "Artificial Lotus Leaf by Nanocasting," Langmuir, vol. 21, No. 19, pp. 8978-8981 (2005).

B. Cortese, et al., "Superhydrophobicity Due to the Hierarchical Scale Roughness of PDMS Surfaces," Langmuir, vol. 24, No. 6, pp. 2712-2718 (2008).

\* cited by examiner a b c

US 8,974,714 B2

PROCESS FOR THE PREPARATION OF SUPERHYDROPHOBIC FILM

CROSS-REFERENCE TO RELATED APPLICATIONS

This patent application is a U.S. National Phase application under 35 U.S.C. §371 of International Application No. PCT/IB2010/000781, filed on Apr. 8, 2010, entitled PROCESS FOR THE PREPARATION OF SUPERHYDROPHOBIC FILM, which claims priority to Italian patent application no. TO2009A 000279, filed on Apr. 9, 2009.

TECHNICAL FIELD

The present invention relates to a process for the preparation of superhydrophobic films.

STATE OF THE ART

By the term "superhydrophobicity" is meant the property of a material of not being wet by water, which instead runs off easily from the surface of said material in the form of drops with an almost perfectly spherical shape. Said effect is also known as "lotus effect", given that it has been observed and studied for the first time on the leaves of said plant.

The interest for the production of superhydrophobic materials is currently very considerable in so far as the possible applications of said materials regard in numerous technological contexts. For example, they can be used for the protection of optical systems or of large glazed surfaces, for the production of pipes with high capacity for flow of fluids, for the integration with microfluidic circuits for biomedical applications, or again for the protection of solar panels.

Known from the relevant literature are numerous processes for the preparation of different superhydrophobic materials; however, just a few of said materials have also the characteristic of being optically transparent.

In fact, the superhydrophobicity of a material is strictly linked to the presence on the surface of the material itself of a roughness in the micrometric/nanometric scale. Said roughness favours scattering of the wavelengths in the spectrum of the visible and of the near infrared, always leading to a reduction and often a total loss of optical transparency.

It is known to produce PDMS superhydrophobic materials by means of a treatment with femtosecond laser pulses [T. O. Yoon et al., Optics Express, 16, 12715 (2008)]. However, this technique is not applicable for large-scale production.

It is moreover known to produce superhydrophobic materials using chemically modified vitreous particles, as described in a publication of the Oak Ridge National Laboratories: [http://www.ornl.gov/info/ornlreview/v41_2_08/articlell.shtml] or as described in M. Hikita et al. [Langmuir 21, 7299 (2005)]. In this case, however, the process proves rather complex and far from adaptable to industrial requirements.

Finally, it is known to produce superhydrophobic materials using the so-called soft-lithography technique, in which a polymer is i) laid (in the liquid phase) on an appropriately structured mould, ii) solidified by means of thermal treatment, and then iii) detached from the mould. Said process has been widely used both for the reproduction of lotus leaves [M. Sun et al., Langmuir 21, 8978 (2005)] and for the reproduction of moulds created with techniques typical of microelectronics [B. Cortese et al., Langmuir 24, 2712 (2008)]. However, in these cases membranes have been obtained that have a low optical transparency or that require subsequent treatments in special apparatuses.

Consequently, there is felt in the art the need for an alternative method for the production of a superhydrophobic material that will be free from the disadvantages of the methods described above.

DISCLOSURE OF INVENTION

Hence an aim of the present invention is to provide a process that is simple, can be applied on an industrial scale, is economically advantageous, and enables an optically transparent superhydrophobic material to be obtained.

According to the present invention said aim is achieved by means of the process claimed.

Definitions

By the term "angle of contact" is meant, in the cross section of a drop of liquid deposited on a solid, the angle comprised between the direction of the solid-liquid tension and the direction of the liquid-vapour tension which is tangential to the outer surface of the drop, with the vertex in the liquid-solid-vapour three-phase point.

By the term "superhydrophobicity" is meant the property of a material of not being wet by water, which instead runs off easily from the surface of said material, in the form of drops having an almost perfectly spherical shape. It has been noted that for these materials the angle of contact is greater than 150°.

By the term "hydrophobic polymer" is meant a polymer on which a drop of water forms an angle of contact greater than 90°.

By the term "PDMS" is meant polydimethylsiloxane.

BRIEF DESCRIPTION OF THE DRAWINGS

For a better understanding of the present invention, a description thereof is now described also with reference to the attached figures, wherein.

DETAILED DESCRIPTION OF THE INVENTION

Figure 1:
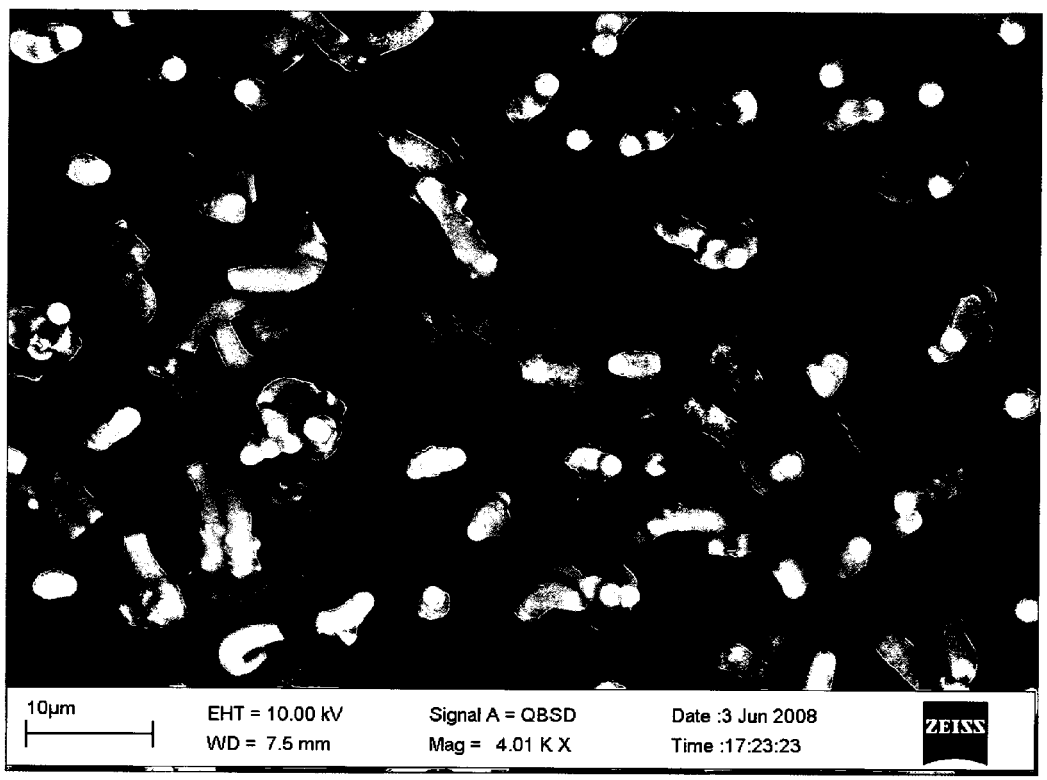
FIG. 1 shows an image obtained under the SEM of the surface of the superhydrophobic film obtained using the process according to the invention.

The process according to the present invention comprises the steps of:
applying a hydrophobic polymer in the liquid phase on a surface so as to form a layer of hydrophobic polymer;
applying on said layer of hydrophobic polymer a membrane having pores with a diameter smaller than or equal to 3 µm and a pore density of between $10^5$ and $6 \times 10^8$ pores/cm$^2$;
subjecting said layer of hydrophobic polymer to a thermal treatment so as to form a superhydrophobic film; and
removing said membrane.

The hydrophobic polymers that can be used with the present process are liquid at room temperature. Before being subjected to the process for formation of the superhydrophobic film they are mixed with an appropriate polymerization agent in order to favour the subsequent step of hardening by thermal treatment. The nature of the polymerization agent affects, in fact, both the viscosity of the hydrophobic polymer and hence its capacity for diffusing in the pores of the membrane and the duration of the step of thermal treatment during which hardening of the polymer and hence formation of the superhydrophobic film is obtained.

Preferably, the hydrophobic polymer is selected in the group constituted by siloxanes, methacrylates, or fluorinated compounds, preferably PDMS.

After being mixed with the polymerization agent, the hydrophobic polymer is applied on a sufficiently smooth surface, such as for example a plate of glass, until a layer of hydrophobic polymer having a thickness of between 30 and 100 μm is obtained.

On the layer of hydrophobic polymer thus obtained there is then applied a membrane, for example of polycarbonate, polyester, or cellulose nitrate. The material of the membrane must be appropriately selected among the materials that do not react with the hydrophobic polymer so as to enable easy removal thereof after formation of the superhydrophobic film.

The membrane has pores with a diameter smaller than or equal to 3 μm, preferably between 800 nm and 1 μm, still more preferably of 2 μm, and a pore density of between $10^5$ and $6 \times 10^8$ pores/cm$^2$, preferably $4 \times 10^7$ pores/cm$^2$. The membrane has a thickness of between 6 and 20 μm, preferably 10 μm.

The polymer in the liquid state is left to penetrate by capillarity into the pores of the membrane and is then thermally treated. The time of penetration and the temperature of the step of thermal treatment depend upon the polymer used, and their selection lies within the normal reach of a person skilled in the branch.

Once the step of thermal treatment of the hydrophobic polymer has terminated and the superhydrophobic film has been obtained, the membrane is eliminated by means of mechanical detachment or, alternatively, by means of chemical degradation with the use of an appropriate solvent.

Advantageously, the method according to the present invention is extremely simple, does not require further subsequent treatments of a photolithographic and/or chemical type, is economically advantageous and can be applied on a wide scale.

The superhydrophobic film obtained has a good transparency in the range of the visible light.

By means of measurements with the FTIR technique, it has been shown that a non-structured PDMS polymeric film has, in the range of wavelengths of the visible, a transparency of around 95% for thicknesses of up to a few tens of microns, i.e., of the order of magnitude of the thicknesses used to obtain superhydrophobic films.

The microstructuring induced by the process does not reduce said value, but obviously increases the amount of light scattered by the film on account of the presence of the protuberances.

The amount of light scattered can be established, within a certain range, by varying the length, diameter, and density of the protuberances. Advantageously, by means of the process of the invention, it is possible by selecting appropriately the density of the pores and their size to enhance either the superhydrophobic properties or the properties of optical transparency.

Further characteristics of the present invention will emerge from the ensuing description of some non-limiting examples provided merely by way of illustration.

EXAMPLE 1

Preparation of the Superhydrophobic Film

PDMS was mixed with a polymerization agent in a ratio 10:1 (Sylgard 184, Dow Chemical) and then degassed to prevent formation of air bubbles. The liquid PDMS was then laid on a plate of glass by spinning to obtain a uniform film with a thickness of approximately 100 μm.

Applied on this film was a polycarbonate membrane with randomly distributed pores with the diameter of 2 μm and a thickness of 10 μm. The PDMS penetrated into the pores of the membrane by capillarity and was then subjected to a thermal treatment at 80° C. for 2 hours.

The PDMS film thus obtained was detached manually from the membrane.

The surface of said film is characterized by a complex morphology, shown in FIG. 1. On the surface protuberances are present (commonly referred to as "pillars") with a disorderly distribution and having a diameter of approximately 2 μm and a height of approximately 10 μm. In FIG. 1, it is possible to recognize at least three different arrangements of the pillars: some remain vertical (approximately 2.5% of the total area), others are bent towards the surface (approximately the 8.5% of the total area), finally others present a complex entangled arrangement (approximately 5% of the total area). In the space free from pillars the surface of the PDMS appears flat (approximately 84% of the total area). It is on account of this complex morphology that the system assumes its characteristics of superhydrophobicity. The explanation can be obtained from an article that appeared recently (A. Tuteja et al., Science 318 1618 (2007)), in which it is shown that regions with negative curvature (like mushrooms) present marked characteristics of superhydrophobicity. In the film obtained according to the process of the present invention, said regions can be identified precisely in the pillars that are bent and entangled.

Advantageously, the PDMS superhydrophobic film obtained is elastic and can be easily detached from the vitreous substrate and applied to another surface. In fact, elastomers have a considerable intrinsic adhesive capacity, which is effective even without the use of adhesives.

EXAMPLE 2

Figure 2:
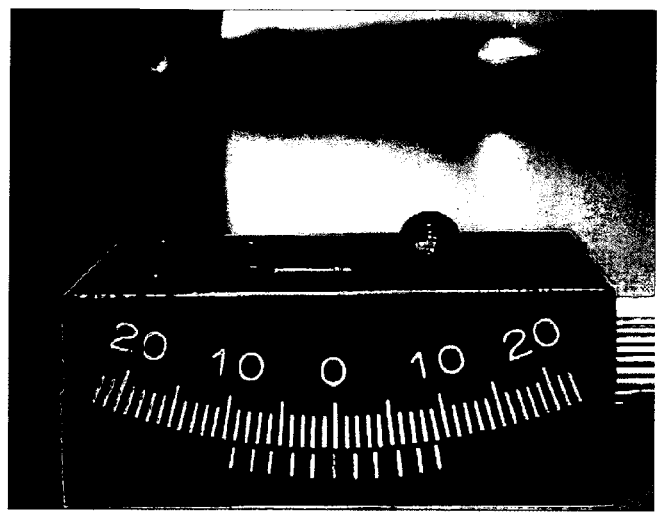
FIG. 2 in boxes a-c reproduces a measurement of the angle of contact.
Figure 2:
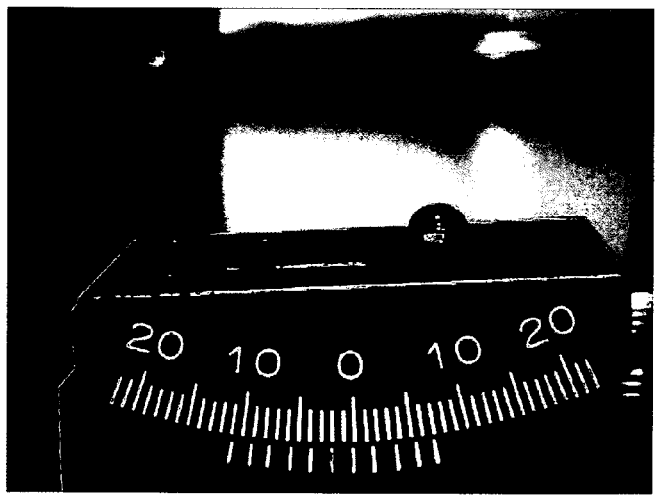
Figure 2:
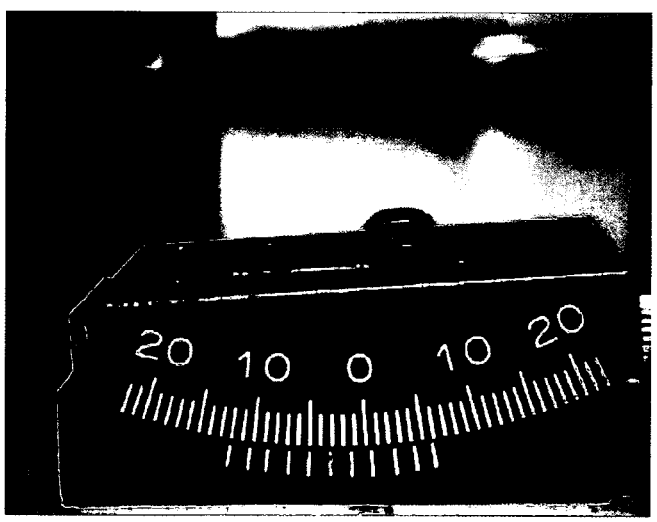

As shown in FIG. 2, on a glass coated by the superhydrophobic film obtained with the process according to the present invention, a drop of water assumes a quasi-spherical shape (box a), unlike what occurs if the same drop is instead deposited on a glass not coated with the superhydrophobic film. If the glass is inclined from the horizontal position, the drop remains immobile (box b) until the angle of inclination reaches 3-4°. At this point, the drop starts to run down along the plane inclined (box c).

This observation shows that the superhydrophobic film produced with the present process enables elimination of drops of water that are initially stationary on the surface merely by inclining the structure by just a few degrees.

The phenomenon is even more important if the drop reaches the surface with a non-zero speed. In this case, running of the drop may be noted, in the direction of the velocity, even if the surface is not inclined.

What is claimed is:

1. A process for the preparation of a superhydrophobic film comprising:
    applying a hydrophobic polymer in the liquid phase on a surface so as to form a layer of hydrophobic polymer,
    applying on said layer of hydrophobic polymer a membrane having pores with a diameter smaller than or equal to 3 μm and a pore density of between $10^5$ and $6 \times 10^8$ pores/cm$^2$,
    subjecting said layer of hydrophobic polymer to a thermal treatment so as to form a superhydrophobic film, and
    removing said membrane.

2. The process according to claim 1, characterized in that said hydrophobic polymer is selected in the group consisting of siloxanes, methacrylates, or fluorinated compounds.

3. The process according to claim 2, characterized in that said hydrophobic polymer is PDMS.

4. The process according to claim 1, characterized in that said membrane has pores with a diameter of between 800 nm and 1 μm.

5. The process according to claim 1, characterized in that said membrane has pores with a diameter of 2 μm.

6. The process according to claim 1, characterized in that said membrane has a porosity of $4 \times 10^7$ pores/cm$^2$.

7. The process according to claim 1, characterized in that said membrane has a thickness of between 6 and 20 μm.

8. The process according to claim 7, characterized in that said membrane has a thickness of 10 μm.

9. The process according to claim 1, characterized in removing said membrane is carried out by means of mechanical detachment of said membrane from said superhydrophobic film.

10. The process according to claim 1, characterized in removing said membrane is carried out by means of chemical degradation of said membrane.

* * * * *